July 23, 1957
A. W. STEN
2,800,041
CUTTING TOOL
Filed March 10, 1955
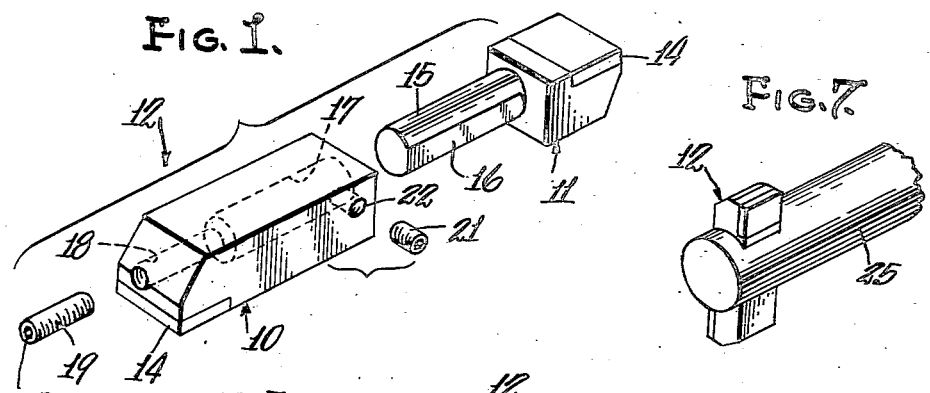
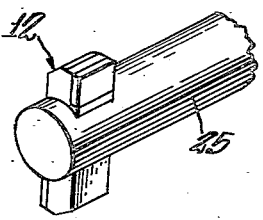
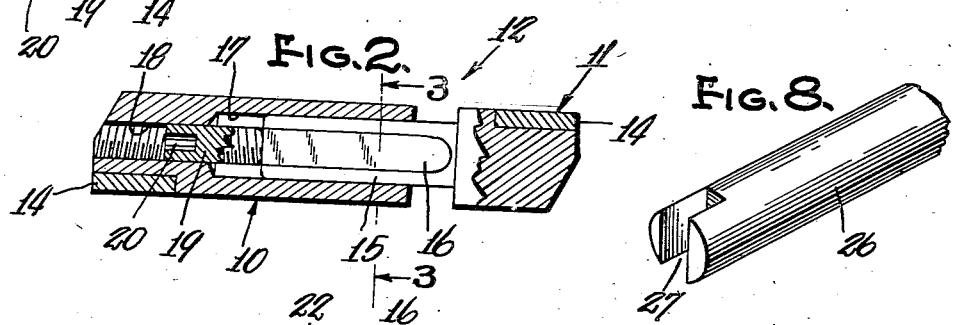
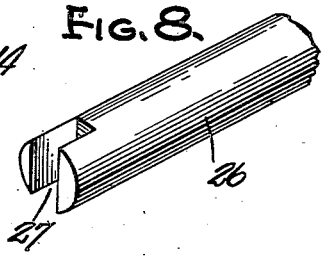
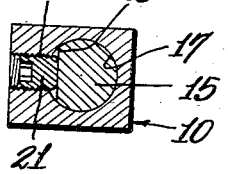
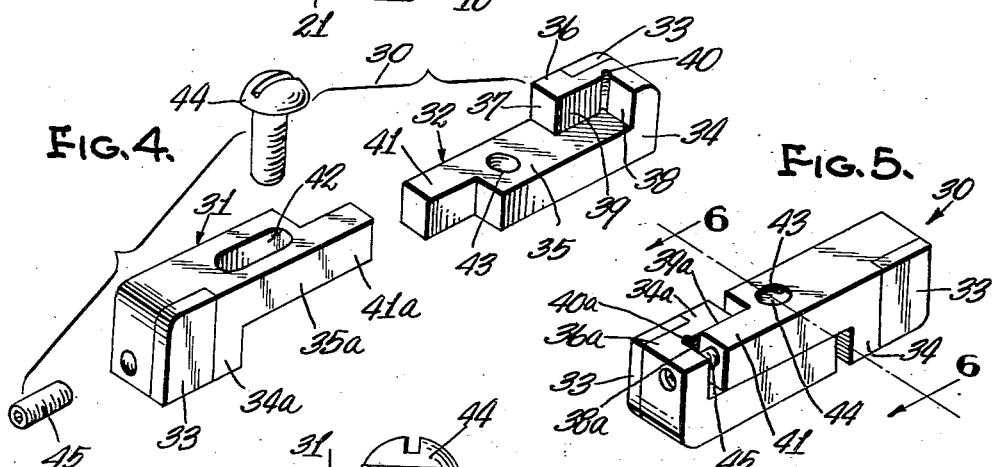
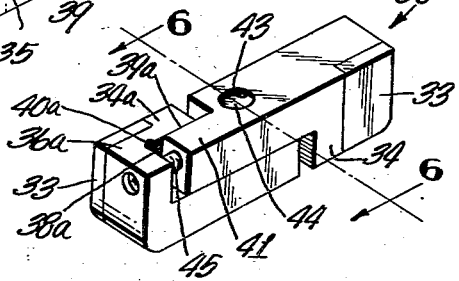
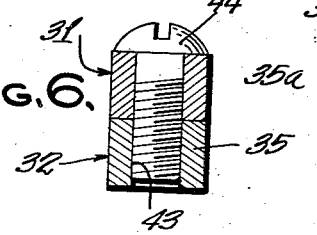
INVENTOR.
ADOLPH W. STEN
BY Michael Williams
ATTORNEY

United States Patent Office 2,800,041
Patented July 23, 1957

2,800,041

CUTTING TOOL

Adolph W. Sten, Leavittsburg, Ohio

Application March 10, 1955, Serial No. 493,383

3 Claims. (Cl. 77—58)

My invention relates to cutting tools for boring and reaming apertures, more particularly to tools which are arranged to float in a direction transverse to the tool holder in order that the tool may adjust itself to any inaccuracy in the alignment between the tool and the work, and the principal object of my invention is to provide new and improved tools of this type.

Cutting tools of the type herein referred to are necessarily made of metals which are relatively expensive and, accordingly, a feature of my invention is to provide a tool which is adjustable to various cutting diameters, thus reducing the necessity of a multiplicity of tools.

The ordinary floater tool of well-known use is made from high grade tool steel and is generally of oblong form with cutting edges of oposite ends thereof. As such tool wears, it requires sharp edges to be reground thereon but, of course, the regrinding process reduces the effective diameter of the tool. Some machinists have elongated the tool by pounding on the side faces thereof but such method of elongation is effective only to increase the length of the tool a very small amount and is subject to serious limitations.

Attempts have been made in the prior art to produce a cutting tool capable of being elongated but such attempts have resulted in producing tools which were not accurate for close tolerance work or tools which were relatively bulky and had only limited applications. My invention has solved the problem of providing a floater tool which is not materially greater in overall size than the tools made of one-piece tool steel and also solved the problem of providing accuracy in an adjustable floater tool.

In the drawing accompanying this specification and forming a part of this application, there are shown, for purposes of illustration, embodiments which my invention may assume, and in this drawing:

Figure 1 is a separated perspective view of a floater tool incorporating my invention, Figure 2 is an enlarged cross-sectional view of the tool shown in Figure 1, but in assembled relation, Figure 3 is a transverse sectional view corresponding generally to the line 3—3 of Figure 2, Figure 4 is a separated perspective view of a floater tool showing another embodiment of my invention, Figure 5 is a perspective view of the tool shown in Figure 4, looking at the undersurface of the tool, and with parts assembled, Figure 6 is a transverse sectional view corresponding generally to the line 6—6 of Figure 5, and Figures 7 and 8 are fragmentary perspective views of boring bars which may be used in connection with the improved tool.

Referring particularly to Figures 1 through 3 of the drawings, the embodiment of the invention therein disclosed comprises a pair of cutter bodies 10 and 11 which when combined form the cutting tool 12. Each cutter body, in the present embodiment, is rectangular in cross section, as illustrated in Figures 1 and 2, and has a cutting edge formed at an end thereof. In the present case, each cutting edge is provided by an insert 14 of high grade tool steel and the remainder of the body is made of less expensive steel, although it will be appreciated that the entire body may be made of high grade tool steel.

The body 11 is formed with a longitudinally extending projection 15 which is preferably cylindrical with the exception of a longitudinal flat 16 for a purpose later to be explained.

The body 10 is provided with a longitudinally extending bore 17 forming a socket which slidably receives the projection 15. Preferably co-axial with the bore 17 is a threaded aperture 18 of less diameter than the bore, the aperture extending from the cutting end of the body 10 to communication with the bottom of the bore 17.

An adjusting screw 19 is threaded into the aperture 18, the screw having a fluted socket 20 at one end for receiving an Allen wrench for the purpose of rotating the screw. The opposite end of the adjusting screw 19 works into the bore 17 and is engageable with the transverse terminal surface of the projection 15 whereby rotation of the adjusting screw 19 in one direction will cause its operating end to bear against the terminal surface of the projection 15 and force it in a direction outwardly of the bore 17. Such action causes longitudinal separation of the cutter bodies 10, 11 to effect elongation of the cutting tool 12.

A holding screw 21 is threaded through a transverse aperture 22 in the body 10, one end of the holding screw being formed with a fluted socket to receive an Allen wrench and the opposite end working into the bore 17 to engage the flat 16 on the projection 15. In this manner, the cutter bodies are held in adjusted relation and against relative rotation. As best seen in Figure 3, the axis of the bore 17 is off-set relative to the axis of body 10 (and the projection 15 is similarly off-set with respect to the axis of the body 11) so that sufficient wall thickness is provided for the threaded aperture 22 without materially increasing the cross-sectional size of the tool 12.

The cutter bodies may be easily and accurately adjusted to a predetermined cutting diameter by loosening the holding screw 21 only enough to permit a restricted sliding movement between projection 15 and bore 17. Thus, sufficient drag is produced to hold the cutter bodies in any adjusted position until the screw 21 is again tightly threaded against the flat 16.

To increase the cutting diameter of the tool 12 from that shown in Figure 2, the tool may be placed between the anvil and the end of the movable spindle of a micrometer (not shown) with the threaded aperture 18 uncovered by the micrometer parts. Assuming that the micrometer has been set to the required bore diameter, the screw 19 is rotated to separate cutter bodies 10, 11 until the cutting edges of such bodies engage the spaced measuring parts of the micrometer with required fit. The holding screw may then be securely tightend and the tool 12 is accurately set and ready for use.

The tool 12 may be used with either of the boring bars shown in Figures 7 and 8, the bar 25 of Figure 7 being preferably used for a straight-through bore whereas the bar 26 of Figure 8 is adapted for use in floating a blind hole. The tool 12 is shown as extending freely through a transverse opening in the bar 25 so that it may move transversely of the axis of the bar and align itself with the axis of the bore being floated. It will be appreciated that the tool 12 may be securely fixed to the bar 25 and be used as an ordinary boring tool.

The bar 26 shown in Figure 8 has a slot 27 which opens into its terminal end and this bar is especially adapted for use with tool 12 in floating blind holes. In such use, the tool is disposed within the slot 27 in position transverse to the axis of the bar, as before. Movement of the bar 26 inward of the hole to be floated holds the tool in position. When the bottom of the hole is reached, the bar 26 is withdrawn, the tool 12 remaining within the hole. The tool may be removed from the hole in any suitable manner, as by shifting the work piece to position the hole vertically with its opening downward, or by reaching into the hole with a wire or the like to engage and withdraw the tool 12.

Referring to Figures 4 through 6 of the drawing, the embodiment of the invention therein disclosed comprises a tool 30 formed of a pair of cutter bodies 31 and 32, each, as before, having a cutting insert 33 at one end.

The cutter bodies in this instance are preferably similar but of opposite hand for complementary cooperation. As best seen in Figure 4, the cutter body 32 has a head portion 34 and a tail portion 35 of lesser transverse size to form a shoulder portion 36 between it and the head portion. The shoulder portion provided generally parallel surfaces 37 and 38 and a surface 39 at right angles to the foregoing surfaces. A relief recess 40 is formed at the intersection of surfaces 38 and 39 for a purpose later to appear. The end of the tail portion 35 is of stepped formation to provide a finger 41.

The cutter body 31 is similar to body 32, but of opposite hand as before mentioned, and corresponding parts of the bodies are designated by like reference numerals, the numerals in the case of the body 31 being supplemented with the suffix "a." The body 31 is formed with an elongated slot 42 extending through the tail portion 35a whereas the body 32 is formed with a threaded aperture 43 for receiving a headed screw 44, the shank of the screw working through the slot 42 and the head of the screw, when the latter is drawn tight, holding the bodies against lateral disassembly and in adjusted relation.

An adjusting screw 45 is threaded through an aperture formed in the body 31, the screw 45 having a socket for receiving an Allen wrench. As before, the socket is accessible from the cutting end of the body 31.

With the bodies 31, 32 in superimposed relation as shown in Figure 5, the finger 41 of body 32 is received within the space defined by surfaces 38a, 39a, the relief 40a permitting the terminal end of finger 41 to move into abutment with surface 38a without any obstruction. It will be appreciated that finger 41a of cutter body 31 is received within the space defined by surfaces 38, 39 of body 32, as suggested in Figure 4.

The operating end of adjusting screw 45 is adapted to bear against the transverse terminal surface of foot 41, as clearly shown in Figure 5. Accordingly, when holding screw 44 is backed off sufficiently to permit restricted relative sliding movement of the cutter bodies 31, 32, the adjusting screw may be rotated in a direction to cause its operating end to push against foot 41 to separate the bodies and thus cause elongation of the tool 30. When the tool has been adjusted to desired size, the holding screw is tightened to hold the cutter bodies in adjusted relation.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. A cutting tool, comprising a pair of cutter bodies each having a cutting edge at one end, the opposite end of one body being reduced in transverse section to provide a longitudinally extending peg-like portion, the other cutter body having a longitudinally extending socket opening at the end opposite its cutting edge for slidably receiving said peg-like portion in telescoping manner whereby said cutter bodies may be joined for longitudinal extension and contraction and held in longitudinally aligned relation, said other cutter body also having a longitudinally extending aperture communicating with the inner end of said socket, and an adjusting screw threadedly engaging said aperture and contacting at its inner end the inner extremity of said peg-like portion of said one body, rotation of said adjusting screw in one direction causing said screw end to push against said peg-like portion and effect longitudinal extension of said bodies.

2. A cutting tool, comprising a pair of cutter bodies each having a cutting edge at one end, the opposite end of one body being reduced in transverse section to provide a longitudinally extending peg-like portion, the other cutter body having a longitudinally extending socket opening at the end opposite its cutting edge for slidably receiving said peg-like portion in telescoping manner whereby said cutter bodies may be joined for relative longitudinal extension and contraction and held in longitudinally aligned relation, said outer cutter body also having a longitudinally extending aperture communicating with the inner end of said socket, an adjusting screw threadedly engaging said aperture and contacting at its inner end the inner extremity of said peg-like portion of said one body, rotation of said adjusting screw in one direction causing said screw end to push against said peg-like portion and effect longitudinal extension of said bodies, and a holding screw threaded into an aperture in said other cutter body, the latter aperture intersecting said socket whereby the inner extremity of said holding screw may be tightened against said peg-like portion to hold said cutter bodies in longitudinally adjusted relation.

3. A cutting tool, comprising a pair of cutter bodies each having a cutting edge at one end, the opposite end of one body being reduced in transverse section to provide a generally cylindrical longitudinally extending portion having a longitudinal flat therein, the other cutter body having a longitudinally extending cylindrical socket opening at the end opposite its cutting edge for slidably receiving said cylindrical portion in telescoping manner whereby said cutter bodies may be joined for longitudinal extension and contraction and held in longitudinally aligned relation, said other cutter body also having a longitudinally extending aperture communicating with the inner end of said socket, an adjusting screw threadedly engaging said aperture and contacting at its inner end the inner extremity of the cylindrical portion of said one body, rotation of said adjusting screw in one direction causing said screw end to push against said cylindrical portion and effect longitudinal extension of said bodies, and a holding screw threaded into an aperture in said other cutter body, the latter aperture intersecting said socket whereby the inner extremity of said holding screw may be tightened against the flat in said cylindrical portion to hold said cutter bodies against relative rotation and in longitudinally adjusted relation.

References Cited in the file of this patent

UNITED STATES PATENTS

| | | |
|---|---|---|
| 1,118,141 | Madison | Nov. 24, 1914 |
| 2,367,560 | Boland | Jan. 16, 1945 |